US011074113B1

(12) United States Patent
Ivester et al.

(10) Patent No.: US 11,074,113 B1
(45) Date of Patent: Jul. 27, 2021

(54) METHOD AND APPARATUS FOR PERFORMING ATOMIC OPERATIONS ON LOCAL CACHE SLOTS OF A SHARED GLOBAL MEMORY

(71) Applicant: EMC IP HOLDING COMPANY LLC, Hopkinton, MA (US)

(72) Inventors: Steven Ivester, Worcester, MA (US); Kaustubh Sahasrabudhe, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/879,831

(22) Filed: May 21, 2020

(51) Int. Cl.
*G06F 12/08* (2016.01)
*G06F 9/52* (2006.01)
*G06F 12/0811* (2016.01)
*G06F 12/0815* (2016.01)
*G06F 12/084* (2016.01)

(52) U.S. Cl.
CPC ............ *G06F 9/526* (2013.01); *G06F 12/084* (2013.01); *G06F 12/0811* (2013.01); *G06F 12/0815* (2013.01); *G06F 2212/1008* (2013.01)

(58) Field of Classification Search
None
See application file for complete search history.

(56) References Cited

U.S. PATENT DOCUMENTS

| | | | | |
|---|---|---|---|---|
| 6,665,775 | B1 * | 12/2003 | Maiyuran | G06F 12/084 |
| | | | | 711/128 |
| 10,102,147 | B1 * | 10/2018 | BenHanokh | G06F 12/128 |
| 2012/0047221 | A1 * | 2/2012 | Georgiev | G06F 12/0804 |
| | | | | 709/213 |
| 2013/0132967 | A1 * | 5/2013 | Soundararajan | H04L 67/06 |
| | | | | 718/104 |
| 2019/0220424 | A1 * | 7/2019 | Guim Bernat | G06F 12/0831 |
| 2020/0042454 | A1 * | 2/2020 | Li | G06F 3/0608 |
| 2021/0133026 | A1 * | 5/2021 | Horn | G06F 11/1076 |
| 2021/0157740 | A1 * | 5/2021 | Benhanokh | G06F 12/0871 |

* cited by examiner

*Primary Examiner* — Kaushikkumar M Patel
(74) *Attorney, Agent, or Firm* — Anderson Gorecki LLP

(57) ABSTRACT

A storage system includes at least two independent storage engines interconnected by a fabric, each storage engine having two compute nodes. A shared global memory is implemented using cache slots of each of the compute nodes. Memory access operations to the slots of shared global memory are managed by a fabric adapter to guarantee that the operations are atomic. To enable local cache operations to be managed independent of the fabric adapter, a cache metadata data structure includes a global flag bit for each cache slot, that is used to designate the cache slot as globally available or temporarily reserved for local IO processing. The cache metadata data structure also includes a mutex (Peterson lock) for each cache slot to enforce a mutual exclusion concurrency control policy on the cache slot between the two compute nodes of the storage engine when the cache slot is used for local IO processing.

19 Claims, 5 Drawing Sheets

FIG. 4

Cache 124
- Cache Metadata 300
- Cache Slot #1 — 400
- Cache Slot #2 — 400
- Cache Slot #3 — 400
- Cache Slot #4 — 400
- •••
- Cache Slot #n

FIG. 3

Cache Control Metadata data structure 300

| 305 | 310 | 315 | 320 | 325 | 330 |
|---|---|---|---|---|---|
| Cache Slot Number | Owner | Lock Holder | Other metadata | Peterson Lock | Flag |
| Cache Slot ID #1 | Owner =$116_1$ | Holder =$116_1$ | Other metadata | $525_1$ | local |
| Cache Slot ID #2 | Owner =$116_1$ | Holder =$116_4$ | Other metadata | Empty | global |
| Cache Slot ID #3 | Owner =$116_2$ | Holder =$116_3$ | Other metadata | $525_3$ | local |
| Cache Slot ID #4 | Owner =$116_2$ | Holder =$116_1$ | Other metadata | Empty | global |
| ••• | ••• | ••• | ••• | ••• | ••• |
| Cache Slot ID #n | Owner =$116_4$ | Empty | Other metadata | Empty | global |

340 → (points to Flag column)

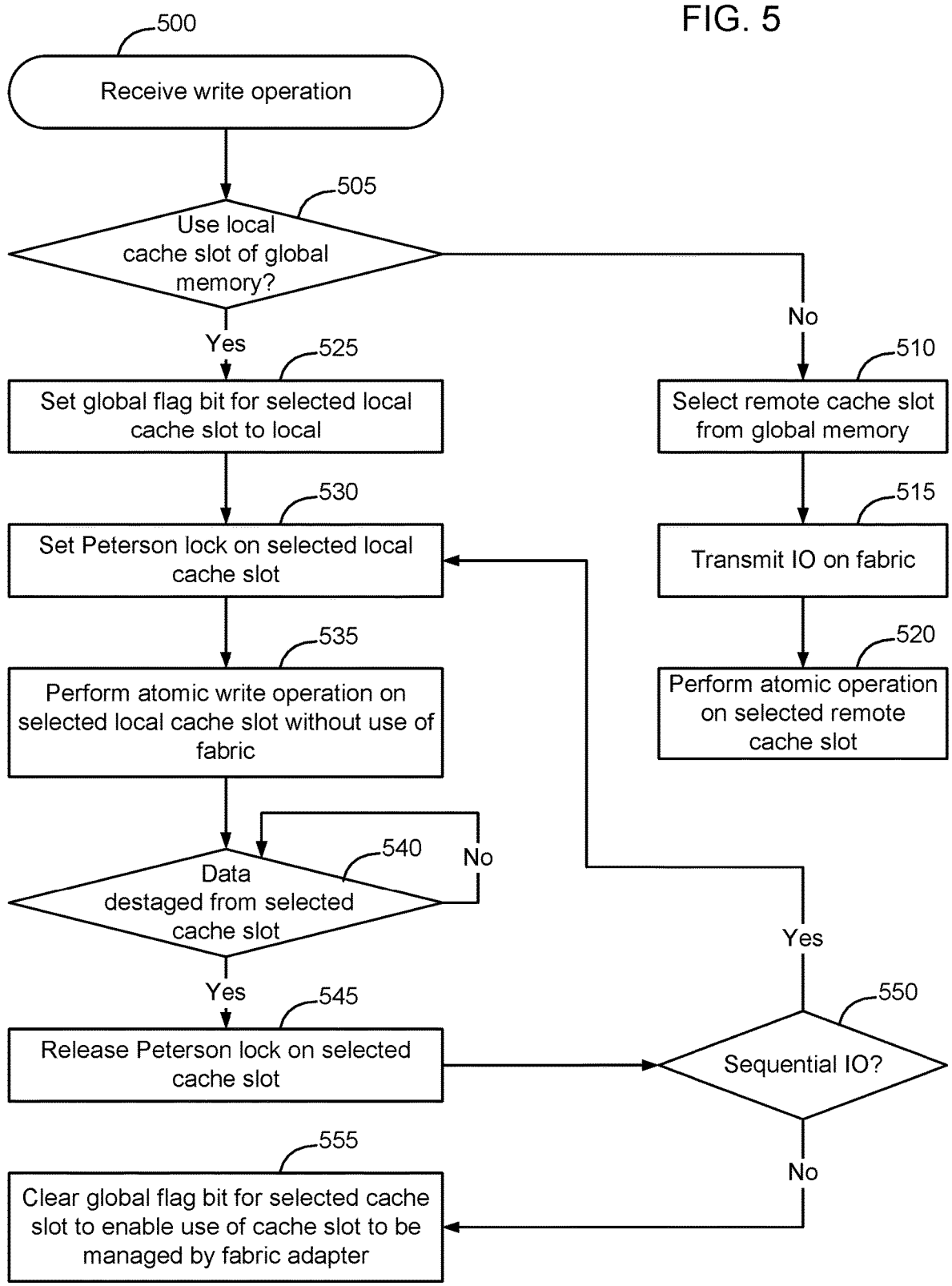

METHOD AND APPARATUS FOR PERFORMING ATOMIC OPERATIONS ON LOCAL CACHE SLOTS OF A SHARED GLOBAL MEMORY

BACKGROUND

This disclosure relates to computing systems and related devices and methods, and, more particularly, to a storage system having storage engines configured to perform atomic operations on local cache slots of a shared global memory.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a storage system includes at least two independent storage engines interconnected by a fabric, each storage engine having two compute nodes. A shared global memory is implemented using cache slots of each of the compute nodes. Memory access operations to the slots of shared global memory are managed by a fabric adapter to guarantee that the operations are atomic. To enable local cache operations to be managed independent of the fabric adapter, a cache metadata data structure includes a global flag bit for each cache slot, that is used to designate the cache slot as globally available or temporarily reserved for local IO processing. The cache metadata data structure also includes a mutex (Peterson lock) for each cache slot to enforce a mutual exclusion concurrency control policy on the cache slot between the two compute nodes of the storage engine when the cache slot is used for local IO processing.

BRIEF DESCRIPTION OF THE DRAWINGS

FIG. 3 is a functional block diagram an example cache control metadata data structure, according to some embodiments.

FIG. 4 is a functional block diagram of an example cache, according to some embodiments.

FIG. 5 is a flow chart of a process of performing an atomic write operation on a local cache slot of a shared global memory, according to some embodiments.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and/or computer instructions that are stored on a non-transitory tangible computer-readable medium and implemented by multi-purpose tangible processors, and any combinations thereof.

Figure 1:
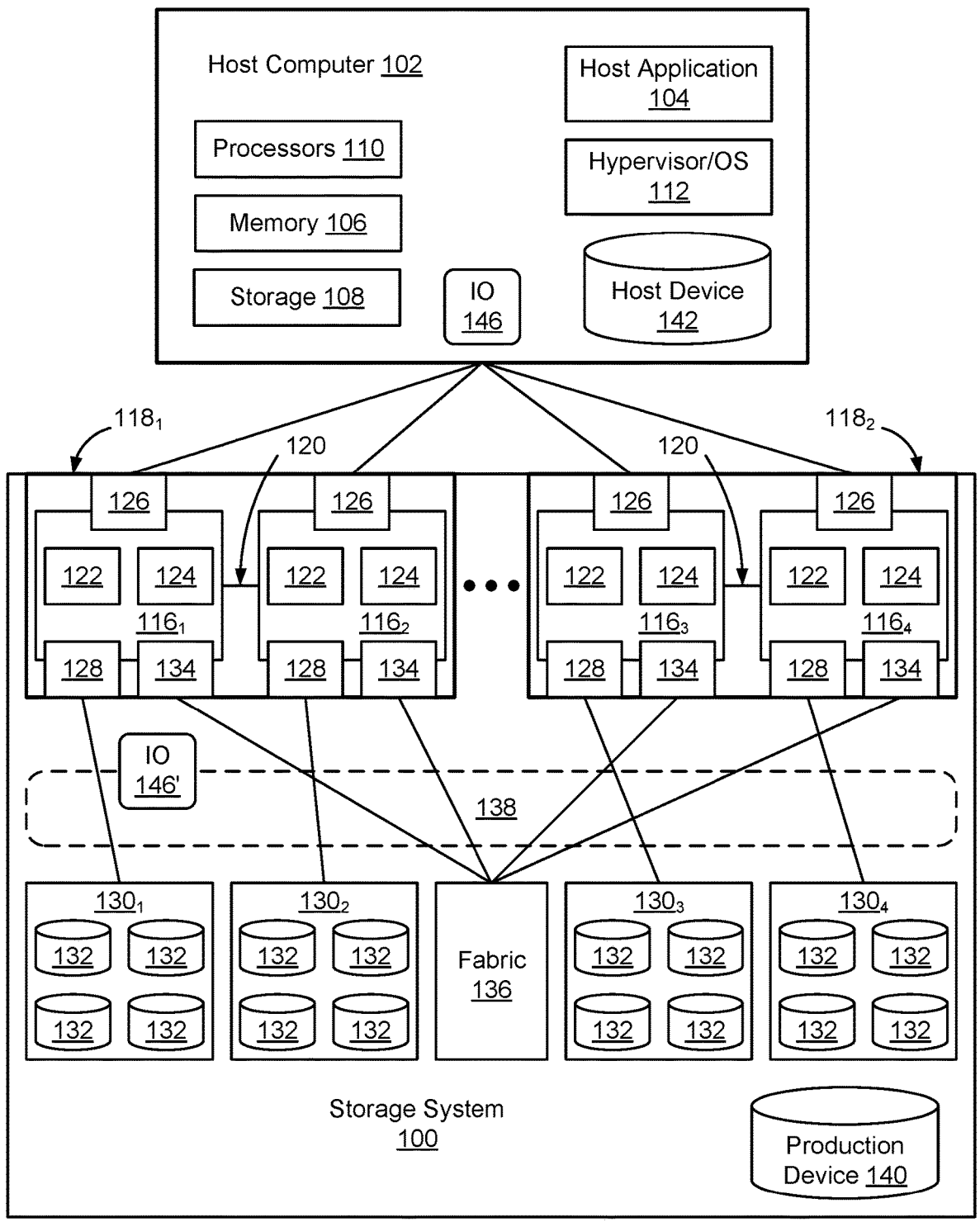
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs, GPUs, and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory implementing a cache 124. The processors 122 may include a plurality of multi-core processors of one or more types, e.g. including multiple CPUs, GPUs, and combinations thereof. The cache 124 may be implemented, for example and without limitation, using any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe (Peripheral Component Interconnect Express) bus, or may be connected to the compute nodes $116_1$-$116_4$, for example, by an IB (InfiniBand) bus or IB fabric switch 136.

In some embodiments, each compute node 116 also includes one or more CAs (Channel Adapters) 134 for communicating with other compute nodes 116 via an interconnecting fabric 136. An example interconnecting fabric may be implemented using InfiniBand.

Each compute node 116 may allocate a portion or partition of its respective local volatile memory implementing cache 124 to a virtual shared "global" memory 138 that can be accessed by other compute nodes 116, e.g. via DMA (Direct Memory Access) or RDMA (Remote Direct Memory Access) such that each compute node 116 may implement atomic operations on the local volatile memory of itself and on the local volatile memory of each other compute node 116 in the storage system 100.

The storage system 100 maintains data for the host applications 104 running on the host computer 102. For example, host application 104 may write host application data to the storage system 100 and read host application data from the storage system 100 in order to perform various functions. Examples of host applications 104 may include, but are not limited to, file servers, email servers, block servers, and databases.

Logical storage devices are created and presented to the host application 104 for storage of the host application data. For example, a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by one or more of the compute nodes $116_1$-$116_4$ at non-contiguous addresses in shared global memory 138 and on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output command) 146 from the host application 104 to the host device 142, the hypervisor/OS 112 determines whether the IO 146 can be serviced by accessing the host computer memory 106. If that is not possible then the IO 146 is sent to one of the compute nodes $116_1$-$116_4$ to be serviced by the storage system 100.

In the case where IO 146 is a read command, the storage system 100 uses storage metadata to locate the commanded data, e.g. in the shared global memory 138 or on managed drives 132. If the compute node does not have the storage metadata and the storage metadata is contained in the memory of another compute node, it will need to first retrieve the storage metadata from the other compute node.

If the commanded data is not in the shared global memory 138, then the data is temporarily copied into the shared global memory 138 from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new storage metadata that maps the address of the data on the production device 140 to a location to which the block is written on the managed drives 132. The shared global memory 138 may enable the production device 140 to be reachable via all of the compute nodes $116_1$-$116_4$ and paths, although the storage system 100 can be configured to limit use of certain paths to certain production devices 140.

In some storage systems 100, a fabric access module 128 on each compute node is used to implement atomic operations on the compute node's local memory 124, regardless of the origin of the atomic operation. For example, if compute node $116_1$ needs to implement an atomic operation on the memory $124_4$ of compute node $116_4$, the compute node $116_1$ will pass the operation to fabric access module $128_1$. Fabric access module $128_1$ will pass the operation over fabric 136 to compute node $116_4$, and the fabric access module 1284 will manage the atomic operation on memory $124_4$ of compute node $116_4$. Similarly, if compute node $116_1$ needs to implement an atomic operation on its own memory $124_1$, the compute node $116_1$ will pass the operation to fabric access module $128_1$. Fabric access module $128_1$ loops the request onto the fabric 136 back to itself, and implements the atomic operation on memory $124_1$. The result is then returned to the fabric access module $128_1$, which provides the result to the CPU 122. By using the fabric access module 134 to ensure that all operations by multiple compute nodes 116 (e.g. compute nodes $116_1$-$116_4$) on the same address are serialized, it is possible to guarantee the atomic nature of the operations on the local memory 124.

However, from a fabric usage standpoint, this means that local operations on cache slots 400 require bandwidth on the fabric 136 and fabric adapter 134. For example, in some storage systems write operations to local cache slots are required to use the fabric switch hardware to automatically manage cache slot extended lock access, irrespective of IO locality. Unfortunately, this means that operations such as read, write, and atomic operations by a compute node 116 on its own cache 124 consume bandwidth of the fabric 136.

According to some embodiments, a cache manager 200 (see FIG. 2) is configured to use cache control metadata 202 to lock slots of the cache 124 for fabricless use only. By temporarily preventing access to the cache slots over the fabric 136, compute nodes 116 outside of storage engine 118 will not be able to perform operations on the local cache slots, thus eliminating the requirement for operations by other compute nodes 116 on the selected cache slot to be serialized.

In some embodiments, a four-byte Peterson lock 325 (see FIG. 3) is included within each entry 340 of the cache control metadata 202 stored in the global memory control slot area. This allows for every cache slot 400 in the storage system 100 to rely on a uniquely assigned Peterson lock for inter-director 118 atomicity. The Peterson lock 325 is only controllable from within the storage engine 118 in which the cache slot is located.

To protect cache slots from being accessed by compute nodes 116 outside of storage engine 118, in some embodiments a global flag bit 330 is provided for each entry 340 of the cache control metadata 202. The global flag bit 330, when set, is used to designate the cache slot 400 temporarily as a fabricless slot. This global flag bit 330 explicitly blocks fabric operations against the cache slot's control metadata 202 until the global flag bit 330 is cleared by one of the local compute nodes 116 holding the Peterson lock 325.

By enabling sequential write operations to be implemented locally without requiring use of the fabric 136, it is possible to reduce fabric bandwidth usage and decrease internal latency of consistent cache slot write operations. By relying on intelligent integration with Open Systems and Mainframe hosts, in some embodiments the storage system 100 provides hints to host 102 at an optimized IO path recommendation, to drive incoming sequential write IOs to a single storage engine 118, thus allowing for the exclusive use of these Peterson locks 325 for the duration of the 10 profile pattern.

Figure 2:
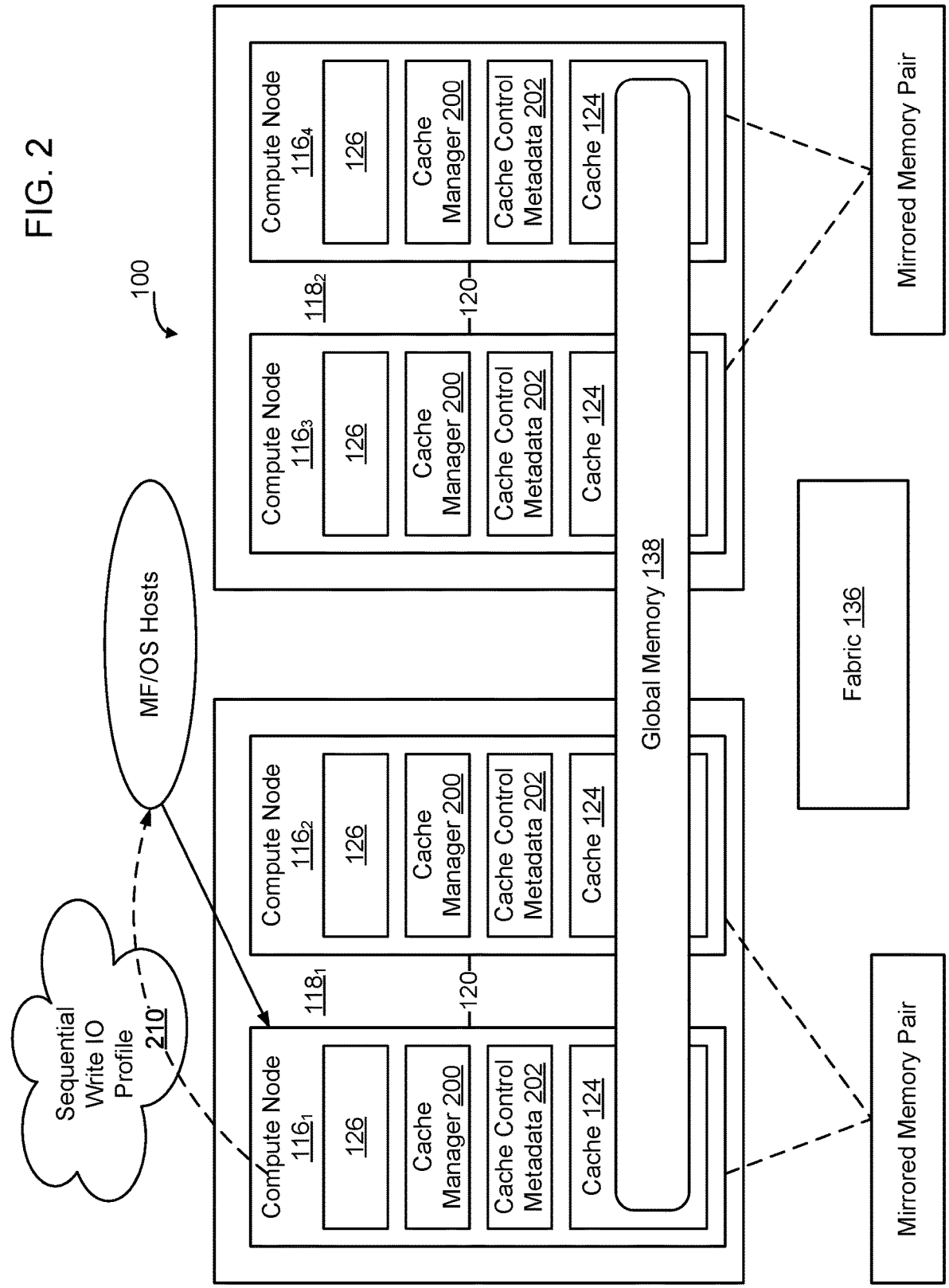
FIG. 2 is a functional block diagram of the storage system of FIG. 1 in greater detail, according to some embodiments.

FIG. 2 is a functional block diagram of an example storage system 100 having a first storage engine $118_1$ and a second storage engine $118_2$. Although the example storage system in FIG. 2 has only two storage engines, the storage system 100 may have any number of storage engines greater than one (two or more storage engines) depending on the implementation. As shown in FIG. 2, in some embodiments each storage engine 118 has dual compute nodes 116. In FIG. 2, director $118_1$ has compute nodes $116_1$ and $116_2$, and director $118_2$ has compute nodes $116_3$ and $116_4$.

As shown in FIG. 2, at least a portion of the cache 124 of each compute node 116 is available as global memory 138. A cache manager 200 on each compute node 116 manages the cache 124 on that compute node 116 by maintaining cache control metadata 202 for each slot in the cache 124. The cache control metadata 202 is used to broker access to the cache slots by competing compute nodes 116. In some embodiments, the cache control metadata 202 is used, for example to lock the cache slots for use by a particular compute nodes 116. In some embodiments, the cache control metadata 202 is itself stored in global memory 138 to enable the cache control metadata 202 to be accessed by each of the compute nodes 116 in the storage system 100.

When one of the compute nodes 116 receives an IO, such as a write operation, the compute node 116 uses the cache control metadata 202 to determine an open cache slot 400, locks the cache slot 400 for use in connection with the IO operation, and then writes the data to the cache slot 400 in global memory 138. The data is then destaged to drives 132 and the cache slot is released for subsequent use. Although FIG. 2 shows each compute node 116 as having cache control metadata 202, in some embodiments all cache control metadata 202 is maintained in a single cache control metadata data structure 300 in global memory 138.

FIG. 3 shows an example cache control metadata data structure 300 and FIG. 4 shows an example cache 400. As shown in FIG. 3, in some embodiments, the cache control metadata data structure 300 includes an entry 340 for each cache slot 400 in global memory 138. In FIG. 3, the data structure 300 is shown in the form of a table, and entries 340 are illustrated as rows of the cache control metadata data structure 300. Other data structures may be used to implement cache control metadata data structure 300 depending on the implementation.

FIG. 4 shows a cache 124 containing an example collection of cache slots 400. The cache slots 400 may be implemented within a single physical memory in a given compute node 116, or maybe formed using multiple memories on a given compute node 116. In some embodiments, cache control metadata data structure 300 includes an entry 340 for each cache slot 400 in the set of caches 124 forming global memory 138.

As shown in FIG. 3, in some embodiments, each entry 340 includes a cache slot ID field 305 identifying the cache slot in global memory 138, and an owner field 310 specifying the actual location of where the cache slot 400 exists in the global memory 138. In some embodiments the owner field 310 identifies the compute node 116 where the cache slot is physically located. For example, in FIG. 3 cache slot ID #1 and cache slot ID #2 are both located in compute node $116_1$, cache slot ID #3 and cache slot ID #4 are both located in compute node $116_2$, and cache slot ID #n is located in compute node $116_4$. Only a small number of entries 340 are shown in FIG. 3, in an actual implementation there may be on the order of millions of cache slots and, accordingly, the cache control metadata data structure 202 would likewise be correspondingly larger.

Each entry 340 in cache control metadata data structure 300 also includes lock holder field 315 identifying which compute node 116 is currently using the cache slot 400. When a compute node 116 requests use of a cache slot 400, a lock 315 is placed on the cache slot 400 and the identity of the compute node 116 that is using the cache slot 400 is written to the lock holder field 315. In FIG. 3, cache slot ID #1 is currently locked by compute node $116_1$, cache slot ID #2 is currently locked by compute node $116_4$, etc. The cache control metadata data structure 300 may include fields 320 for various other cache control metadata depending on the implementation.

According to some embodiments, each entry 340 of cache control metadata data structure 300 includes a field 325 to implement a Peterson lock. A Peterson lock 325 is a lock based on the Peterson algorithm which allows two or more processes to share a single-use resource without conflict, using only shared memory for communication. In some embodiments, the Peterson lock 325 is four bytes in length, although other size Peterson locks 325 may be used as well depending on the implementation. Although some embodiments will be described in which a Peterson lock 325 is used to regulate access to cache slots 400, other forms of locks or mutexes may be used to enforce a mutual exclusion concurrency control policy on the cache slots 400.

In some embodiments, the Peterson lock 325 is only controllable from within the storage engine 118 in which the cache slot mirrors are located. For example, cache slot ID #1 is located in compute node $116_1$, which resides in storage engine $118_1$. Accordingly, since storage engine $118_1$ includes compute nodes $116_1$ and $116_2$, the Peterson lock $325_1$ for the entry 340 associated with cache slot ID #1 is only controllable by compute node $116_1$ or compute node $116_2$.

As shown in FIG. 3, in some embodiments each entry 340 includes a global flag bit 330. When global flag bit 330 is set on a particular cache slot, access to the cache slot is not allowed over the fabric. This prevents a compute node 116 from outside of the storage engine 118 from obtaining access to a cache slot 400. In some embodiments, when the global flag bit 330 is set, all fabric operations are blocked against the slots' control metadata until the bit is cleared by one of the local directors holding the Peterson lock 325. By preventing access to the cache slot via the fabric 136, only nodes local to storage engine 118 are able to use the cache slot.

In some embodiments, when a write operation arrives on front end adapter 126 of a storage engine 118, the compute node 116 will assume responsibility for write operation and select a cache slot 400 that is in a cache 124. Where the selected cache slot is on a different compute node 116 within the storage engine 118, in some embodiments the write operation occurs on CMI (Common Messaging Interface) link 120. If the selected cache slot is local (within storage engine 118), the global bit 330 for the selected cache slot 400 is set to designate the cache slot 400 as fabricless, to prevent other compute nodes 116 in other storage engines 118 from issuing transactions on the cache slot over fabric 136. The compute nodes 116 then use the cache slot for the sequential write operation on the storage engine 118 for the duration of the IO profile pattern.

When the sequential write has completed, the Peterson lock is released and the global bit 330 is reset to enable remote compute nodes 116 to issue atomic operations on the cache slot over the fabric 136. By setting the global bit 300 to prevent operations on the cache slot over the fabric 136, and using the Peterson lock to allow only one of the compute nodes 116 within storage engine 118 to use the cache slot 400 at a time, it is possible to ensure that the write operation on the cache slot are atomic without requiring the operation to be managed by the fabric adapter 134. Accordingly, the write operation on the cache slot can take place independent of the fabric 136 to thereby reduce bandwidth on the fabric 136 when write operations are able to be implemented locally.

FIG. 5 is a flow chart of an example process of implementing atomic write operations on local cache slots of a shared global shared memory, according to some embodiments. As shown in FIG. 5, when a write operation arrives at a compute node 116, (block 500) the compute node 116 will determine if a local cache slot 400 forming part of global memory 138 should be used (block 505). In some embodiments, a local cache slot is a cache slot 400 in the cache 124 of one of the compute nodes 116 of storage engine 118.

If a local cache slot 400 is not selected (a determination of NO at block 505), the write operation will be implemented by the compute node 116 on a cache slot 400 of one of the other compute nodes 116 in a different storage engine 118. Accordingly, the compute node 116 that has assumed responsibility for the write operation will select an available cache slot 400 from global memory 138 (block 510) transmit the IO on the fabric 136 (block 515) and perform the atomic operation on the selected remote cache slot (block 520).

If a local cache slot is selected (a determination of YES at block 505), the write operation will be implemented by the compute node 116 on a local (to storage engine 118) cache slot 400 without passing the IO onto fabric 136. In some embodiments, the compute node 116 sets the global flag bit 330 for the selected local cache slot to local (block 525) to prevent compute nodes 116 in other storage engines 118 from competing for access to the selected local cache slot. The Peterson lock 325 is then set on the selected local cache slot (block 530) to prevent the other compute node 116 within the storage engine 118 from accessing the selected cache slot. The compute node 116 that has assumed responsibility for the IO then performs the atomic write operation on the selected local cache slot without use of the fabric 136 (block 530). Since compute node 116 is the only compute node with access to the selected cache slot, the write operation is guaranteed to be atomic.

In some embodiments, the compute node 116 will maintain ownership of the cache slot by maintaining the Peterson lock on the cache slot until the data is destaged from the selected cache slot (block 540). Once the data is destaged (a determination of YES at block 540), the Peterson lock may be released on the selected cache slot (block 545).

If additional write operations are occurring, for example in connection with a sequential write operation, the global flag 330 will remain set, to enable the compute nodes 116 to continue to use the cache slot 400 in local mode for the duration of the sequential write. In some embodiments, a determination is made in block 550 as to whether the write operation is part of a sequential write operation. The determination in block 550 may take into account information received from the host 102 regarding the write profile. If the write operation is determined to be part of a sequential write operation (a determination of YES at block 550), the global flag bit 330 is not changed and the compute nodes 116 will contend for access to the slot using Peterson lock 325 (block 530). When the cache slot is no longer required to be used for local write operations, such as when the write profile indicates that the write is not part of a sequential write operation (a determination of NO at block 550), the global flag 330 for the selected cache slot is cleared (block 555). This causes the cache slot to be managed by the fabric adapter 134, so that all operations against the cache slot, both by local compute nodes and remote compute nodes, are processed via fabric adapter 134.

In some embodiments, sources of write operations such as host computers 102 are provided with information about an optimized IO path recommendation to drive incoming sequential write IOs to a single storage engine 118 in the storage system 100. This is shown in FIG. 2 by dashed arrow 210, which indicates that a host 102 is provided with a recommendation to steer IO operations with particular sequential write IO profiles to compute node $116_1$ on storage engine $118_1$. By encouraging IO operations with particular sequential write profiles to be directed to specified storage engines 118, it is possible to enable particular operations such as long sequential writes to be implemented locally without use of the fabric 136. By localizing write operations, and not using the fabric 136 in connection with these operations, the fabric bandwidth is able to be used for other operations in storage system 100, thus increasing the responsiveness of the storage system 100 and reducing latency associated with processing IO operations by storage system 100.

Figure 6:
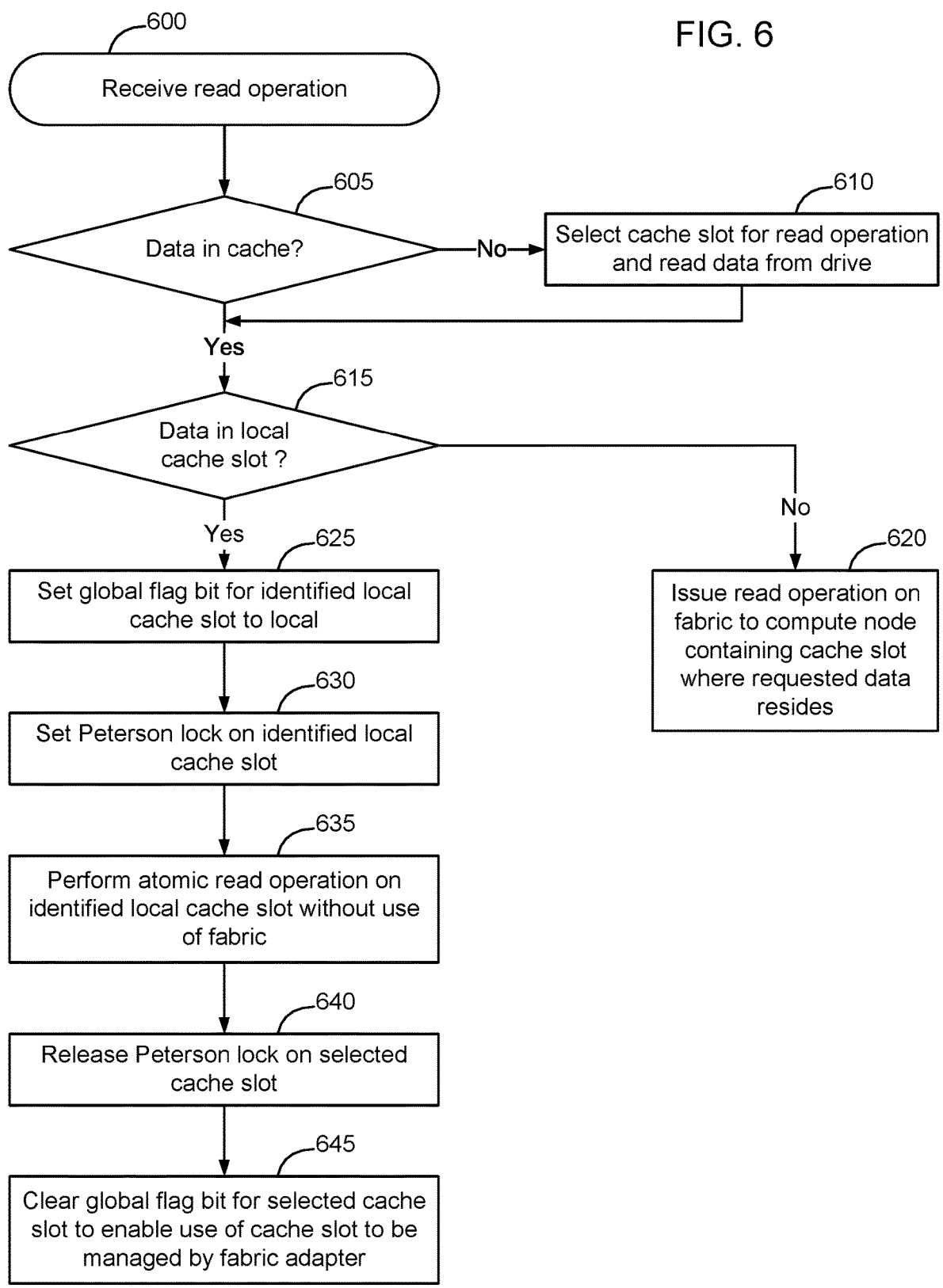
FIG. 6 is a flow chart of a process of performing an atomic read operation on a local cache slot of a shared global memory, according to some embodiments.

FIG. 6 is a flow chart of an example process of implementing atomic read operations on local cache slots of a shared global shared memory, according to some embodiments. As shown in FIG. 6, when a read operation arrives at a compute node 116, (block 600) the compute node 116 will determine if the requested data is in cache (block 605). If the data is not in global memory 138, the requested data will need to be read from drive 132 into global memory 138. Accordingly, if the requested data is not in cache (a determination of NO at block 605), a cache slot is selected for the read operation and the requested data is read from the drive into the selected cache slot.

If the requested data is in cache (a determination of YES at block 605) or once the requested data has been read into the cache at block 610, a determination is then made as to whether the requested data resides in a local cache slot (block 615). If the requested data is not in a local cache slot (a determination of NO at block 615), the read operation is issued on the fabric to the compute node 116 containing the cache slot where the requested data resides in global memory 138.

If the requested data is in a local cache slot, optionally the read operation may be implemented in a fabricless manner by setting the global flag bit for the identified cache slot to local (block 625). The Peterson lock for the cache slot is then set (block 630) and an atomic read operation is performed on the cache slot without use of the fabric (block 635). Once the read operation has completed, the Peterson lock is released (block 640) and the global flag bit for the cache slot is cleared to enable use of the cache slot to be managed by the fabric adapter (block 645).

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A storage system, comprising:
a first storage engine having a first compute node, a second compute node, a first fabric adapter, and a second fabric adapter, the first compute node having a first cache and the second compute node having a second cache;
a second storage engine having a third compute node, a fourth compute node, a third fabric adapter, and a fourth fabric adapter, the third compute node having a third cache and the fourth compute node having a fourth cache;
the first cache, second cache, third cache, and fourth cache each containing respective cache slots, and at least a subset of the cache slots forming a shared global memory for use by the first, second, third and fourth compute nodes; and
a cache metadata data structure having an entry for each of the cache slots forming the shared global memory, each entry including a global flag bit and a mutex, the global flag bit identifying a respective cache slot as either being managed by one of the fabric adapters or not managed by the one of the fabric adapters, and the mutex being configured to enforce a mutual exclusion concurrency control policy on the cache slot when the cache slot is not managed by the one of the fabric adapters.

2. The storage system of claim 1, wherein the mutex is a Peterson lock.

3. The storage system of claim 1, further comprising control logic configured to:
receive an IO operation by the storage system;
provide the IO operation to the first compute node of the first storage engine;
select, by the first compute node, a cache slot from the shared global memory to be used to process the IO operation;
if the selected cache slot is not located within the first storage engine, manage the IO operation by the first fabric adapter of the first compute node; and
if the selected cache slot is located within the first storage engine:
set the global flag bit for the selected cache slot in the cache metadata data structure;
obtain control of the mutex for the selected cache slot in the cache metadata data structure; and
process the IO operation against the selected cache slot without use of the first fabric adapter of the first compute node.

4. The storage system of claim 3, wherein the IO operation is a write operation.

5. The storage system of claim 4, wherein the control logic configured to process the IO operation comprises control logic configured to write data to the selected cache slot and destage the data from the selected cache slot to a location in permanent storage.

6. The storage system of claim 3, wherein the IO operation is a read operation.

7. The storage system of claim 3, further comprising control logic configured to release control of the mutex for the selected cache slot after processing the IO operation against the selected cache slot.

8. The storage system of claim 3, further comprising control logic configured to clear the global flag bit for the selected cache slot after releasing control of the mutex for the selected cache slot.

9. A non-transitory tangible computer readable storage medium having stored thereon a computer program for performing atomic operations on cache slots of a shared global memory, the computer program including a set of instructions which, when executed by a computer, cause the computer to perform a method comprising the steps of:

receiving an IO operation by a storage system, the storage system having at least two independent storage engines interconnected by a fabric, each storage engine having two compute nodes, each compute node having a cache with a plurality of cache slots and a fabric access module controlling access to the cache slots, wherein the fabric access modules are configured to enable at least a subset of the cache slots of each compute node to be accessible by each of the other compute nodes to form a shared global memory;

providing the IO operation to a first of the compute nodes of a first of the storage engines;

selecting, by the first of the compute nodes, a cache slot from the shared global memory to be used to process the IO operation;

if the selected cache slot is not located within the first of the storage engines, managing the IO operation by the fabric access module of the first of the compute nodes; and if the selected cache slot is located within the first of the storage engines:

setting a global flag bit for the selected cache slot in a cache metadata data structure;

obtaining control of a mutex for the selected cache slot in the cache metadata data structure, the mutex being configured to enforce a mutual exclusion concurrency control policy on the cache slot between the two compute nodes of the first of the storage engines; and processing the IO operation against the selected cache slot without the fabric access module of the first of the compute nodes.

10. The non-transitory tangible computer readable storage medium of claim 9, wherein the mutex is a Peterson lock.

11. The non-transitory tangible computer readable storage medium of claim 9, wherein the IO operation is a write operation.

12. The non-transitory tangible computer readable storage medium of claim 11, wherein the step of processing the IO operation comprises writing data to the selected cache slot and destaging the data from the selected cache slot to a location in permanent storage.

13. The non-transitory tangible computer readable storage medium of claim 9, wherein the IO operation is a read operation.

14. The non-transitory tangible computer readable storage medium of claim 9, further comprising releasing control of the mutex for the selected cache slot after the step of processing the IO operation against the selected cache slot.

15. The non-transitory tangible computer readable storage medium of claim 9, further comprising clearing the global flag bit for the selected cache slot after the step of releasing control of the mutex for the selected cache slot.

16. A method of performing atomic operations on cache slots of a shared global memory, comprising:

receiving an IO operation by a storage system, the storage system having at least two independent storage engines interconnected by a fabric, each storage engine having two compute nodes, each compute node having a cache with a plurality of cache slots and a fabric access module controlling access to the cache slots, wherein the fabric access modules are configured to enable at least a subset of the cache slots of each compute node to be accessible by each of the other compute nodes to form a shared global memory;

providing the IO operation to a first of the compute nodes of a first of the storage engines;

selecting, by the first of the compute nodes, a cache slot from the shared global memory to be used to process the IO operation;

if the selected cache slot is not located within the first of the storage engines, managing the IO operation by the fabric access module of the first of the compute nodes; and if the selected cache slot is located within the first of the storage engines:

setting a global flag bit for the selected cache slot in a cache metadata data structure;

obtaining control of a mutex for the selected cache slot in the cache metadata data structure, the mutex being configured to enforce a mutual exclusion concurrency control policy on the cache slot between the two compute nodes of the first of the storage engines; and processing the IO operation against the selected cache slot without the fabric access module of the first of the compute nodes.

17. The method of claim 16, wherein the mutex is a Peterson lock.

18. The method of claim 16, wherein the IO operation is a write operation, and wherein the step of processing the IO operation comprises writing data to the selected cache slot and destaging the data from the selected cache slot to a location in permanent storage.

19. The method of claim 16, wherein the IO operation is a read operation, the method further comprising:

releasing control of the mutex for the selected cache slot after the step of processing the IO operation against the selected cache slot; and clearing the global flag bit for the selected cache slot after the step of releasing control of the mutex for the selected cache slot.

* * * * *